(12) United States Patent
Spatscheck et al.

(10) Patent No.: US 9,497,211 B2
(45) Date of Patent: *Nov. 15, 2016

(54) SYSTEMS, METHODS, AND DEVICES FOR DEFENDING A NETWORK

(71) Applicant: AT&T Intellectual Property II, LP, Atlanta, GA (US)

(72) Inventors: Oliver Spatscheck, Randolph, NJ (US); Jacobus E. Van der Merwe, Salt Lake City, UT (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/250,933

(22) Filed: Apr. 11, 2014

(65) Prior Publication Data

US 2014/0223559 A1    Aug. 7, 2014

Related U.S. Application Data

(63) Continuation of application No. 13/690,789, filed on Nov. 30, 2012, now Pat. No. 8,719,446, which is a continuation of application No. 11/234,433, filed on Sep. 23, 2005, now Pat. No. 8,346,960.

(60) Provisional application No. 60/652,985, filed on Feb. 15, 2005.

(51) Int. Cl.
*G06F 15/173* (2006.01)
*H04L 29/06* (2006.01)

(52) U.S. Cl.
CPC ....... *H04L 63/1441* (2013.01); *H04L 63/1416* (2013.01); *H04L 63/1458* (2013.01); *H04L 2463/141* (2013.01)

(58) Field of Classification Search
CPC .................................................. H04L 63/1441
USPC ........................................................... 726/22
See application file for complete search history.

(56) References Cited

U.S. PATENT DOCUMENTS 7,062,782 B1    6/2006    Stone et al.
7,307,999 B1    12/2007    Donaghey
(Continued)

FOREIGN PATENT DOCUMENTS

WO    01/46807    6/2001
WO    02/025402    3/2002
WO    02/123805    3/2002

OTHER PUBLICATIONS

Cisco, "Cisco Anomaly Guard Module", located at http://www.cisco.com/en/US/products/hw/modules/ps2706/products_data_sheet0900aecd80220a7c.html, Jan. 1, 2005, 11 page(s), Cisco Systems, Inc.

*Primary Examiner* — Peter Shaw
(74) *Attorney, Agent, or Firm* — Akerman LLP; Michael K. Dixon; Mammen (Roy) P. Zachariah, Jr.

(57) ABSTRACT

Certain exemplary embodiments comprise a method comprising: within a backbone network: for backbone network traffic addressed to a particular target and comprising attack traffic and non-attack traffic, the attack traffic simultaneously carried by the backbone network with the non-attack traffic: redirecting at least a portion of the attack traffic to a scrubbing complex; and allowing at least a portion of the non-attack traffic to continue to the particular target without redirection to the scrubbing complex.

16 Claims, 3 Drawing Sheets

(56) References Cited

U.S. PATENT DOCUMENTS

| | | |
|---|---|---|
| 7,359,322 B2 | 4/2008 | Khurana et al. |
| 7,389,537 B1 | 6/2008 | Callon et al. |
| 7,418,733 B2 | 8/2008 | Connary et al. |
| 7,738,373 B2 * | 6/2010 | Lerner .......................... 370/232 |
| 2002/0083175 A1 * | 6/2002 | Afek .................. H04L 63/1416 709/225 |
| 2002/0131432 A1 | 9/2002 | Bachmutsky et al. |
| 2004/0028054 A1 | 2/2004 | Khurana et al. |
| 2004/0128539 A1 * | 7/2004 | Shureih ............... H04L 63/1458 726/22 |
| 2004/0148520 A1 | 7/2004 | Talpade et al. |
| 2005/0180416 A1 | 8/2005 | Jayawardena et al. |
| 2006/0282892 A1 | 12/2006 | Jonnala et al. |
| 2007/0022479 A1 | 1/2007 | Sikdar et al. |

* cited by examiner

SYSTEMS, METHODS, AND DEVICES FOR DEFENDING A NETWORK

CROSS-REFERENCES TO RELATED APPLICATIONS

This application is a continuation of and claims priority to U.S. patent application Ser. No. 13/690,789 filed Nov. 30, 2012 which claims priority to U.S. patent application Ser. No. 11/234,433 filed Sep. 23, 2005, now U.S. Pat. No. 8,346,960, which claims priority to U.S. Provisional Patent Application Ser. No. 60/652,985, filed Feb. 15, 2005, all of which are hereby incorporated by reference in their entireties.

BRIEF DESCRIPTION OF THE DRAWINGS

A wide variety of potential embodiments will be more readily understood through the following detailed description of certain exemplary embodiments, with reference to the accompanying exemplary drawings in which.

DETAILED DESCRIPTION

Attacks, such as attacks utilizing flooding, denial of service, Distributed Denial of Service ("DDOS"), viruses, worms, trojan horses, rouge applications, malware, exploits, spam, phishing, etc., are becoming an ever-increasing problem in today's Internet. For example, denial of service attacks can cause consumption and/or overload of scarce, limited, and/or non-renewable system and/or network resources, such as bandwidth, disk space, CPU time, and/or allocations thereof; destruction and/or alteration of configuration information, such as routing information; disruption of normal operating system functionality; and/or physical destruction and/or alteration of network components, etc.

Attempts to "flood" a network with bogus packets, thereby preventing legitimate network traffic, are a common form of attack, often conducted by disrupting network connectivity with the use of multiple hosts in a distributed denial-of-service attack or DDoS. Such attacks can consume the resources of intervening systems and networks over which the attack is transmitted. Other than incorrectly formed packets or random traffic, two specific sophisticated means of attack include:

a smurf attack, in which ICMP requests are sent to the broadcast address of misconfigured networks, with a faked, or spoofed, source IP Address set to the one of the target; and A SYN flood, in which bogus SYN requests to a service (often HTTP) cause a server to be overloaded by spawning half-open connections.

The source addresses of this traffic are often spoofed in order to hide the true origin of the attack. Due to this and the many vectors of attack, there can be relatively few comprehensive rules that can be implemented on network hosts in order to protect against denial-of-service attacks, and it can be a difficult feat to determine the source of the attack and the identity of the attacker. This is especially true with distributed attacks.

In a distributed attack, the attacking computers can be personal computers with broadband connections to the Internet that have been compromised by viruses or Trojan horse programs These can allow the perpetrator to remotely control machines to direct the attack, and such an array of computers is sometimes called a botnet. With enough such slave or zombie hosts, the services of even the largest and most well-connected websites potentially can be disrupted.

Hence, certain exemplary embodiments comprise a method comprising: within a backbone network: for backbone network traffic addressed to a particular target and comprising attack traffic and non-attack traffic, the attack traffic simultaneously carried by the backbone network with the non-attack traffic: redirecting at least a portion of the attack traffic to a scrubbing complex; and allowing at least a portion of the non-attack traffic to continue to the particular target without redirection to the scrubbing complex.

Figure 1:
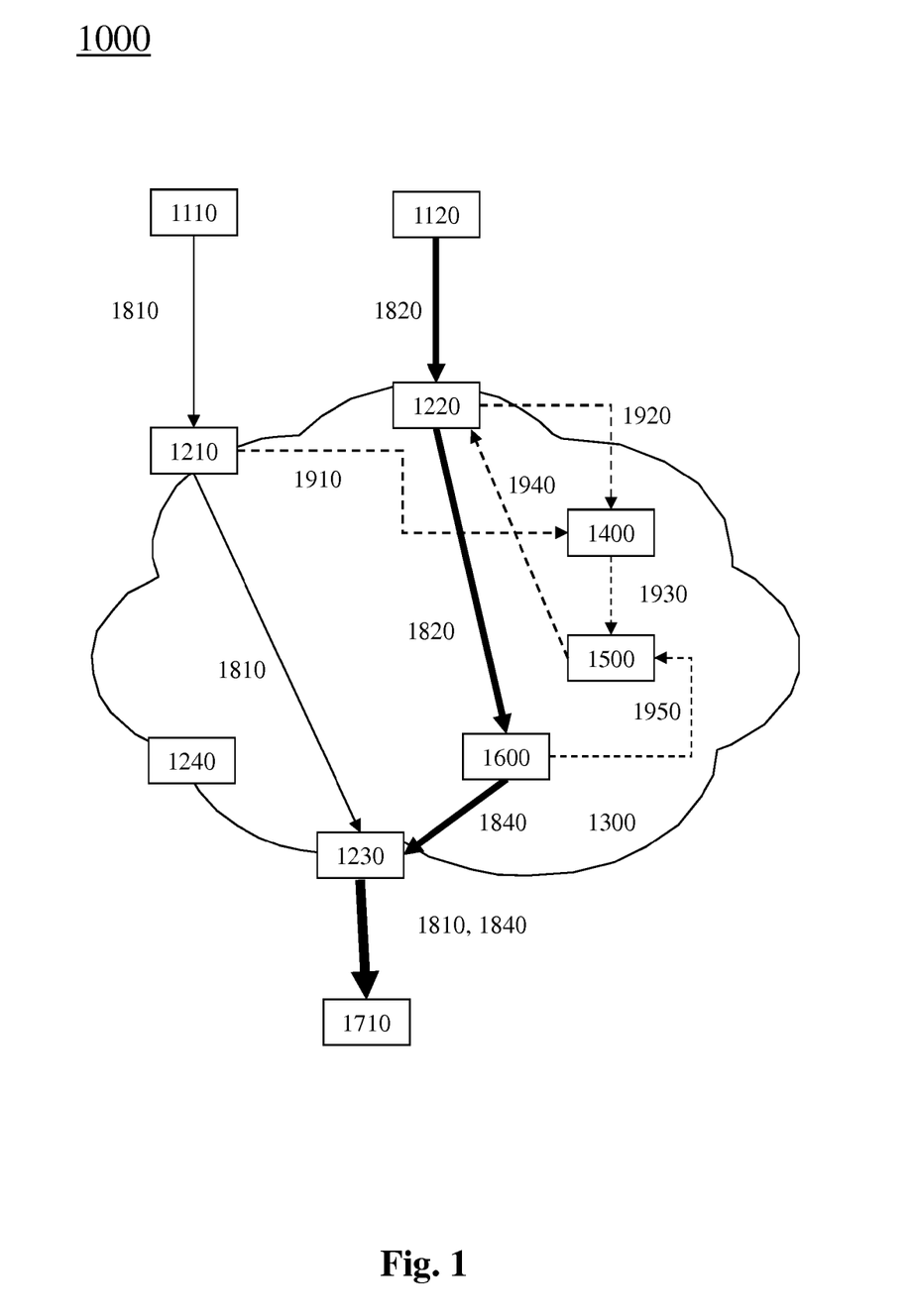
FIG. 1 is a block diagram of an exemplary embodiment of a system 1000.

FIG. 1 is a block diagram of an exemplary embodiment of a system 1000, which can comprise a traffic source 1110. Traffic from traffic source 1110, 1120 can enter a backbone network 1300 via a backbone network ingress point 1210, such as a routing entity, which can be an edge router. Any of backbone network ingress points 1210, 1220, 1230, 1240 (any of which can function also and/or instead as egress points) can be monitored by a traffic monitoring and/or anomaly detection tool 1400 (such as Arbor Network's Peak Flow SP traffic monitoring and anomaly detection service and/or device), which can report a source identifier of suspect traffic, such as suspected DDOS traffic and/or suspected attack traffic, to a route controller 1500. Upon learning a source identifier for suspect traffic, route controller 1500 can cause the suspect traffic to be redirected to scrubbing complex 1600 (such as Cisco System's Anomaly Guard). At scrubbing complex 1600, the suspect traffic can be analyzed and filtered, such that attack traffic, such as malicious traffic and/or DDOS traffic, is blocked, and non-attack traffic is forwarded and/or allowed to continue towards its target, e.g., destination 1710, such as via backbone network egress points and/or edge routers 1230 and/or 1240. Scrubbing complex 1600 can provide feedback to route controller 1500, which in response, can adjust what traffic it causes to be redirected to scrubbing complex 1600.

Traffic monitoring and/or anomaly detection device 1400, route controller 1500, and/or scrubbing complex 1600 can be located within backbone network 1300 and/or can potentially provide any of the herein-described functions for any amount of traffic, whether non-DDOS, DDOS, attack, and/or non-attack traffic, any number of traffic sources and/or identifiers, any number of backbone network ingress points, any number of backbone network egress points, any number of routing entities, and/or any number of targets and/or destinations, etc.

For example, assume that traffic 1810, which flows from and/or through source 1110 and to backbone network ingress point 1210, is non-attack, non-malicious, and/or non-DDOS traffic addressed to a particular target, destination 1710. Via interface, path, and/or communication 1910, traffic monitoring and/or anomaly detection device 1400 can monitor backbone network ingress point 1210 and/or can determine that traffic 1810 is non-attack, non-malicious, and/or non-DDOS traffic. Thus, traffic monitoring and/or anomaly detection device 1400 can opt and/or decide not report traffic 1810 to route controller 1500, thereby not causing traffic 1810 to be redirected to scrubbing complex 1600. Instead, traffic 1810 can flow through backbone network 1230 to router and/or backbone network egress point 1230 from which traffic 1810 can flow to its destination 1710.

In a similar manner, assume that traffic 1820, which flows from source 1120, is attack, malicious, and/or DDOS traffic.

Both traffic 1810 and 1820 are simultaneously carried by backbone network 1300 and/or are addressed to a particular target, namely destination 1710. Via interface, path, and/or communication 1920, traffic monitoring and/or anomaly detection device 1400, can monitor backbone network ingress point 1220 and/or determine that traffic 1810 is non-attack, non-malicious, and/or non-DDOS traffic. Thus, traffic monitoring and/or anomaly detection device 1400 can opt and/or decide not report traffic 1810 to route controller 1500. Thereby, traffic 1810 can be automatically allowed to continue to flow through backbone network 1230 to router and/or backbone network egress point 1230 from which traffic 1810 can flow to its particular target and/or destination 1710 without redirection to scrubbing complex 1600.

Via interface, path, and/or communication 1920 and/or a separate interface, path, and/or communication, a human operator and/or traffic monitoring and/or anomaly detection device 1400 can manually or automatically determine, however, that traffic 1820, which flows from and/or through source 1120 and to backbone network ingress point 1220, is potentially, likely, and/or certain to be attack, malicious, and/or DDOS traffic. Thus, via interface, path, and/or communication 1930, a human operator and/or a traffic monitoring and/or anomaly detection device 1400 can manually or automatically provide an alert, alarm, and/or information to route controller 1500, the alert, alarm, and/or information providing an indicator of traffic 1820, backbone network ingress point 1220, source 1120, and/or an address and/or identifier thereof. In certain exemplary embodiments, the alert, alarm, and/or information can be provided only if more than a configurable amount and/or portion of the traffic associated with a particular source, received by a particular ingress point, and/or addressed for a particular target is considered to be attack, malicious, and/or DDOS traffic.

Upon receiving information regarding traffic 1820 and/or its source of traffic 1820, route controller 1500 can, via interface, path, and/or communication 1940, automatically redirect, and/or cause backbone network ingress point 1220 to route, any portion of traffic 1820 to scrubbing complex 1600. Upon receiving traffic 1820, scrubbing complex 1600 can automatically analyze traffic 1820, and/or automatically block any portion thereof that it determines to be attack, malicious, and/or DDOS traffic. Scrubbing complex 1600 can automatically forward to backbone network 1300 and/or an intended egress router 1230 any portion 1840 of traffic 1820 that is not determined to be attack, malicious, and/or DDOS traffic. Thus, traffic 1840 can be considered to be "clean and scrubbed". Upon receipt, egress router can automatically route and/or deliver traffic 1840 to its intended destination 1710. In certain exemplary embodiments, scrubbing complex 1600 can automatically tunnel, via any tunneling protocol, clean and scrubbed traffic 1840 directly to intended egress router 1230 and/or destination 1710. Use of a tunnel can avoid repeatedly looping the clean and scrubbed traffic through scrubbing complex 1600.

If scrubbing complex 1600 determines that traffic 1820, traffic from a particular source, and/or traffic addressed for a particular target, etc., no longer comprises a predetermined, substantial, and/or any amount of attack, malicious, and/or DDOS traffic, scrubbing complex 1600 can automatically report that information to route controller 1500 via interface, path, and/or communication 1950, such that route controller 1500 can automatically cause the traffic to cease being redirected to scrubbing complex 1600.

Information can be automatically reported, intermittently and/or continuously, from scrubbing complex 1600 to route controller 1500, such as via a syslog and/or XML feed, and/or via remote procedure calls, HTTP, and/or SOAP, etc. Such information can comprise statistics determined by scrubbing complex 1600, the statistics specifying, for example, the amount and/or portion of traffic the various redirected sources contributed to an attack, a malicious attack, and/or a DDOS attack. As another example, the statistics can rank the sources, ingress points (which can also be considered sources), and/or traffic contributing to the overall attack, malicious, and/or DDOS traffic addressed to a particular target.

In certain exemplary embodiments, only sources, ingress points, and/or traffic contributing more than a predetermined amount and/or portion of all attack, malicious, and/or DDOS traffic addressed to a particular target, such as during a predetermined time period, are redirected to scrubbing complex 1600, thereby potentially reducing the load on scrubbing complex 1600 without significantly increasing the attack, malicious, and/or DDOS traffic arriving at the target. Thus, somewhat similar in concept to load balancing, scrubbing complex 1600 and/or route controller 1500 can provide automated, adaptive, surgical, closed loop, and/or dynamic control of the type, nature, amount, and/or portion, etc., of traffic received by scrubbing complex 1600 while achieving a high level of removal of the attack, malicious, and/or DDOS traffic, thereby potentially increasing the return on the investment made into scrubbing complex 1600.

In certain exemplary embodiments, to redirect traffic 1820 from backbone network ingress point 1220 to scrubbing complex 1600, upon receipt of a CIDR block associated with attack traffic 1820, route controller 1500 can automatically assess an existing route and next hop for traffic 1820. Then, route controller 1500 can automatically selectively insert and/or advertise, such as via iBGP, a route to backbone network ingress point 1220, that route comprising a longer prefix and a next hop address associated with the scrubbing complex. Because it has a longer prefix, the advertised route to scrubbing complex 1600 can be considered a more specific route. Because route controller 1500 can be automatically treated as a peer (e.g., an iBGP peer) of backbone network ingress point 1220 (and/or every other routing entity in backbone network 1300), upon receipt, backbone network ingress point 1220 can automatically install the advertised route in its route forwarding table. Because the newly installed route to the scrubbing complex 1600 is more specific that the existing route associated with received traffic 1820, backbone network ingress point 1220 can automatically route traffic 1820 according to the more specific route stored in its forwarding table. Thus, instead of traffic 1820 being routed to egress point 1230, traffic 1820 can be automatically redirected to scrubbing complex 1600.

Figure 2:
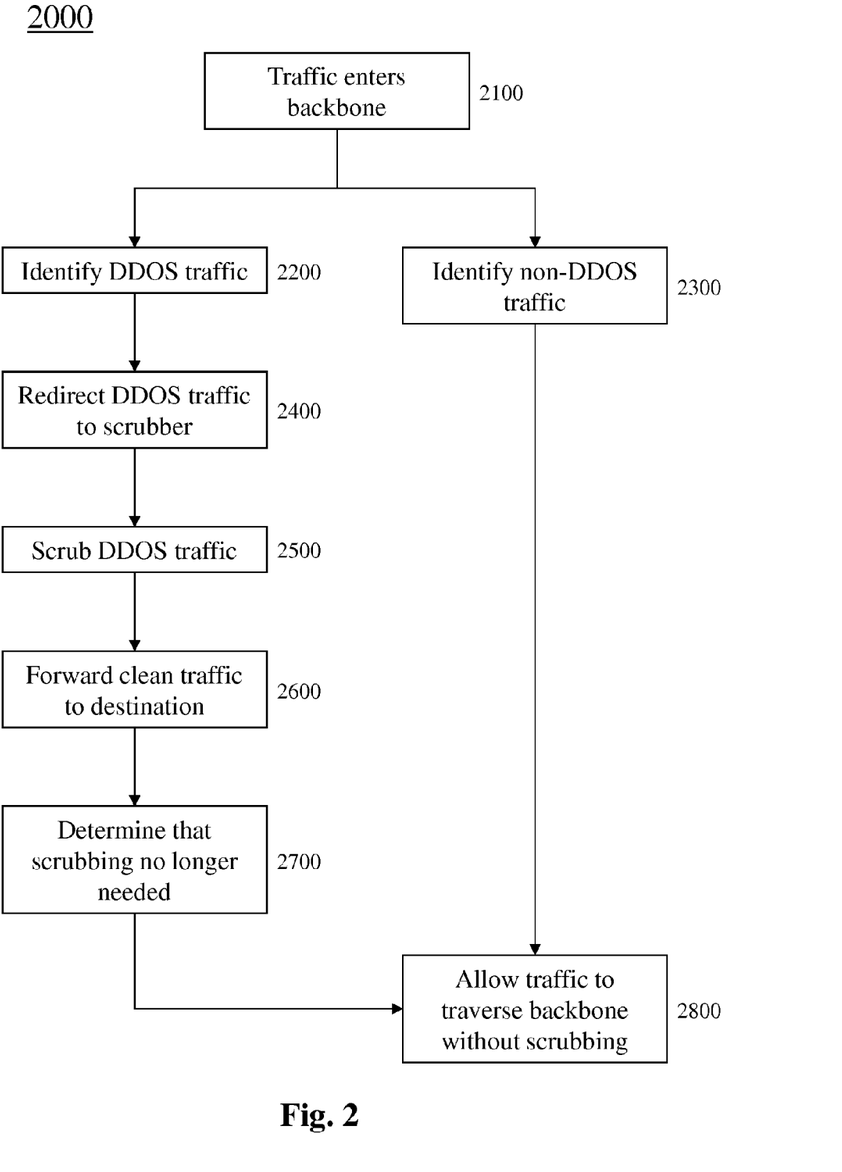
FIG. 2 is a flowchart of an exemplary embodiment of a method 2000.

FIG. 2 is a flowchart of an exemplary embodiment of a method 2000. At activity 2100, traffic can enter the backbone network, such as via an ingress point, routing entity, and/or router. At activity 2200, at least a portion of the entering traffic can be recognized as potential attack traffic, such as DDOS traffic. At activity 2300, at least a portion of the entering traffic can be recognized as non-attack traffic, such as non-DDOS traffic. At activity 2400, the suspected attack traffic can be redirected, potentially by a route controller, to a scrubbing complex. At activity 2500, the suspected attack traffic can be scrubbed, such that actual attack traffic is blocked and/or terminated, and non-attack traffic is identified as "clean", "scrubbed clean", and/or "clean and scrubbed". At activity 2600, the scrubbed clean traffic can be forwarded to its intended destination. At activity 2700, the scrubbing complex and/or the route controller can determine that scrubbing is no longer needed. At activity 2800, all traffic can be allowed to traverse the backbone without scrubbing.

Figure 3:
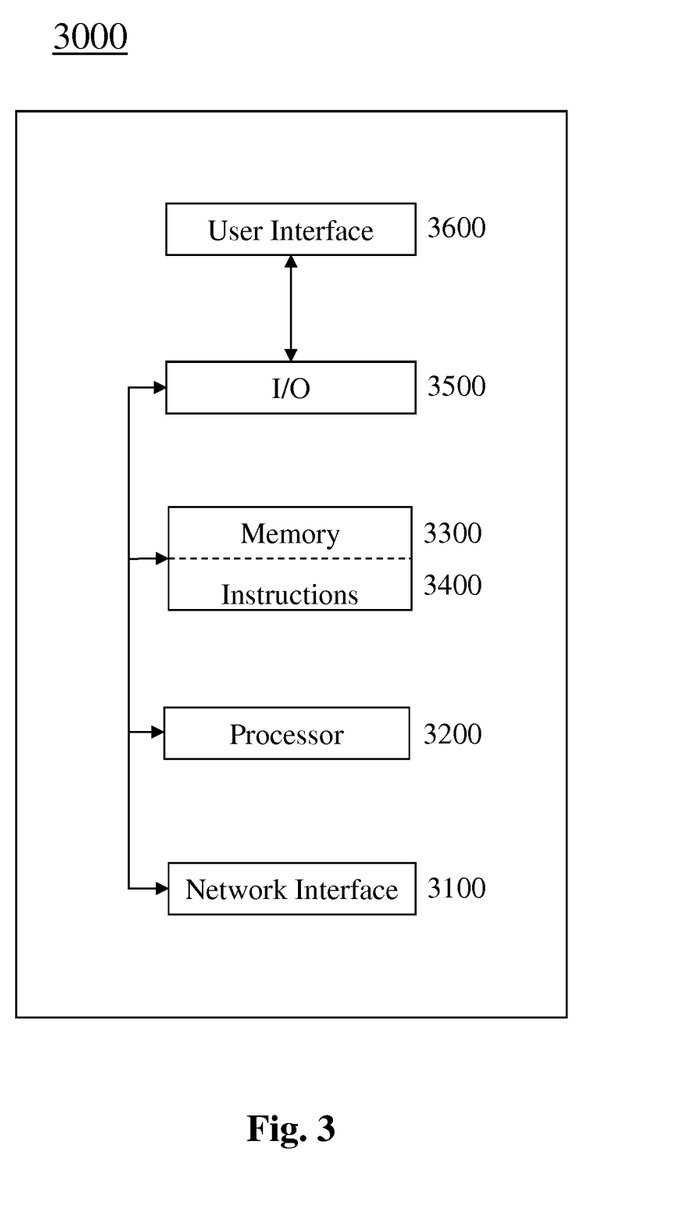
FIG. 3 is a block diagram of an exemplary embodiment of an information device 3000.

FIG. 3 is a block diagram of an exemplary embodiment of an information device 3000, which in certain operative embodiments can comprise, for example, in hardware, firmware, and/or software, source 1110-1120, ingress points 1210-1240, traffic monitoring and/or anomaly detection device 1400, route controller 1500, scrubbing complex 1600, egress points 1210-1240, and/or destination 1710 of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user and/or administrator can view a rendering of information, such as analysis, statistics, alarms, notifications, and/or communications regarding traffic, attack traffic, DDOS traffic, a traffic source, traffic sources, targets, scrubbing, etc.

DEFINITIONS

When the following terms are used substantively herein, the accompanying definitions apply:

a—at least one.

activity—an action, act, step, and/or process or portion thereof.

adapted to—made suitable or fit for a specific use or situation.

address—(n.) an identifier of, and/or a description of a physical and/or logical location of, a node in a network; (v.) to provide and/or having an identifier of, and/or a description of a physical and/or logical location of, a node in a network.

advertise—to distribute via a route distribution protocol such as iBGP.

allow—to let do or happen and/or to permit.

amount—a quantity.

and/or—either in conjunction with or in alternative to.

apparatus—an appliance or device for a particular purpose.

associate—to relate, bring together in a relationship, and/or connect.

attack—one or more malicious and/or offensive acts occurring via a network.

automatically—acting or operating in a manner essentially independent of external influence or control. For example, an automatic light switch can turn on upon "seeing" a person in its view, without the person manually operating the light switch.

backbone network—a "transit" network, often made up of long-distance telephone trunk lines and/or other wired and/or wireless links such as microwave and satellite links, adapted for transmitting large amounts of data simultaneously between host computer systems connected to the Internet. Normal communicated data typically neither originates nor terminates in a backbone network.

can—is capable of, in at least some embodiments.

carry—to transmit, convey, and/or communicate.

clean and scrubbed DDOS traffic—suspected DDOS traffic that is directed to a scrubbing complex and there determined to be non-DDOS traffic.

comprising—including but not limited to.

continue—to go on with a particular action, to carry on, and/or to resume.

contribute—to give, provide, supply, and/or transmit.

data—distinct pieces of information, usually formatted in a special or predetermined way and/or organized to express concepts.

DDOS traffic—traffic comprised in a DDOS attack.

define—to establish the outline, form, and/or structure of.

destination—a place, address, and/or entity to which a transmission is ultimately directed.

determine—to ascertain, obtain, and/or calculate.

device—a machine, manufacture, and/or collection thereof.

Distributed Denial of Service (DDOS) attack—one or more malicious and/or offensive acts comprising an intentional and substantially simultaneous transmission of massive amounts of traffic to a particular target from numerous sources, the purpose of the attack to substantially prevent the target from receiving other traffic. Often launched by disgruntled users, unscrupulous businesses, and/or extortionists targeting specific sites or competitors, such attacks can paralyze destination sites, servers, and/or computers, potentially preventing their victims from conducting business, and thereby costing substantial sums due to lost transactions, damaged reputations, legal liabilities, and/or repairs, etc. DDOS attacks typically are composed of requests that appear legitimate, comprise spoofed origin identities, and/or are sent from any number of zombie sources.

enter—to come and/or flow into.

flow—a group of similar packets.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

identity—the collective aspect of the set of characteristics by which a thing is definitively recognizable and/or known, and/or information that distinguishes an entity.

information—processed, stored, and/or transmitted data.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

ingress point—a device and/or interface where traffic enters a network.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

insert—to put or introduce into.

intermediate—between, yet not including, an endpoint.

machine instructions—directions adapted to cause a machine to perform a particular operation or function.

machine readable medium—a physical structure from which a machine can obtain data and/or information. Examples include a memory, memory device, punch cards, bar code, etc.

may—is allowed to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

non-DDOS traffic—traffic not comprised in a DDOS attack.

obtain—to receive, get, and/or take possession of.

packet—a generic term for a bundle of data organized in a specific way for transmission, and comprising the data to be transmitted and certain control information.

particular—distinct.

plurality—the state of being plural and/or more than one.

portion—a part, percentage, and/or ratio.

predetermined—established in advance.

prefix—an IP network address, typically expressed as a network address part and a subnet mask length, the subnet mask length identifying the number of bits that are significant and/or the number of bits needed to designate the subnet mask, which is a 32 bit combination used to describe which portion of an address refers to the subnet and which portion refers to the host, the subnet being a portion of a network sharing a particular address. For example, for the IP address 10.1.1.1, a prefix can be 10.0.0.0/8, 10.1.0.0/16, and/or 10.1.1.0/24, where the /N represents the subnet mask length. A prefix having a larger subnet mask length is considered longer (and more specific/preferred) than a prefix having a numerically smaller subnet mask length. For example, the prefix of 10.1.1.0/24 is considered longer than prefix of 10.1.0.0/16, which is considered longer than a prefix of 10.0.0.0/8.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

receive—to take, obtain, acquire, take in, and/or get.

redirect—to change the direction and/or route of.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

route—a path along which information, such as packets, can be sent.

route controller—a device adapted to receive, evaluate, modify, exchange, transmit, and/or forward traffic routes to devices, such as routers, in a backbone network, each route comprising a destination subnet prefix, destination address, and/or next hop address.

routing entity—a device adapted to direct traffic. Examples include a router, route-reflector, route server, server-based router, router-switch, sets of routers, and/or intra-networking devices, etc. A typical routing entity operates at least at the bottom 3 layers (Physical, Link, and Network layers) of the OSI model.

scrubbing complex—a system for processing suspected malicious traffic, such as by blocking and/or terminating DDOS traffic and/or by forwarding non-DDOS traffic to its intended destination.

select—to choose.

selectively—via choice.

set—a related plurality.

simultaneously—at substantially the same time.

smaller—having a subnet mask length less than.

source—an original and/or intermediate transmitter of traffic and/or a related group of such transmitters.

source identifier—a group of symbols that are unique to a particular original and/or intermediate transmitter of traffic and/or related group of such transmitters. Source identifiers comprise: ingress router address, ingress interface address, source IP address, source AS, source prefix, etc.

store—to place, hold, and/or retain data, typically in a memory.

substantially—to a great extent or degree.

system—a collection of mechanisms, devices, data, and/or instructions, the collection designed to perform one or more specific functions.

target—a destination.

traffic—packets, bytes, and/or a flow thereof.

treat—to subject to a process, treatment, action, and/or change.

tunnel—a path followed by encapsulated packets, a point-to-point connection over which packets are exchanged which carry the data of another protocol, and/or a virtual encrypted connection formed between two systems over a network, such as a backbone network.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

within a backbone network—a device, and/or via a device, having an IP address comprised by the domain of the backbone network.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A system for defending a network, comprising:
    a memory that stores instructions;
    a processor that executes the instructions to perform operations, the operations comprising:
        providing an alert to a route controller if greater than a configurable amount of network traffic comprises attack traffic, wherein the network traffic is addressed to a target;
        redirecting, if greater than the configurable amount of the network traffic comprises the attack traffic, a portion of the attack traffic to a scrubbing complex;
        transmitting a portion of non-attack traffic of the network traffic to the target without redirection to the scrubbing complex;
        providing feedback to a route controller, wherein the portion of the attack traffic that is redirected to the scrubbing complex is adjusted by the route controller based on the feedback;
        transmitting, to the target, scrubbed attack traffic from the scrubbing complex via a tunnel, and
        ranking, by utilizing statistics determined by the scrubbing complex, a plurality of ingress points contributing to the attack traffic.

2. The system of claim 1, wherein the operations further comprise not redirecting the portion of the attack traffic to the scrubbing complex if greater than the configurable amount of the network traffic does not comprise the attack traffic.

3. The system of claim 1, wherein the operations further comprise ranking a plurality of sources that are transmitting the attack traffic to the target, wherein the sources are ranked based on an amount of the network traffic contributed by each source of the plurality of sources.

4. The system of claim 1, wherein the tunnel prevents the scrubbed attack traffic from being looped repeatedly through the scrubbing complex.

5. The system of claim 1, wherein the operations further comprise determining if the network traffic comprises the attack traffic.

6. The system of claim 1, wherein the operations further comprise providing the alert to the route controller if greater than a predetermined amount of the network traffic comprises the attack traffic.

7. The system of claim 1, wherein the operations further comprise providing the alert to the route controller if the attack traffic is associated with a predetermined source.

8. A method for defending a network, comprising:
providing, by utilizing instructions from a memory that are executed by a processor, an alert to a route controller if greater than a configurable amount of network traffic comprises attack traffic, wherein the network traffic is addressed to a target;
redirecting, if greater than the configurable amount of the network traffic comprises the attack traffic, a portion of the attack traffic to a scrubbing complex;
transmitting a portion of non-attack traffic of the network traffic to the target without redirection to the scrubbing complex;
providing feedback to a route controller, wherein the portion of the attack traffic that is redirected to the scrubbing complex is adjusted by the route controller based on the feedback;
transmitting, to the target, scrubbed attack traffic from the scrubbing complex via a tunnel; and
ranking, by utilizing statistics determined by the scrubbing complex, a plurality of ingress points contributing to the attack traffic.

9. The method of claim 8, further comprising not redirecting the portion of the attack traffic to the scrubbing complex if greater than the configurable amount of the network traffic does not comprise the attack traffic.

10. The method of claim 8, further comprising ranking a plurality of sources that are transmitting the attack traffic to the target, wherein the sources are ranked based on an amount of the network traffic contributed by each source of the plurality of sources.

11. The method of claim 8, wherein the tunnel prevents the scrubbed attack traffic from being looped repeatedly through the scrubbing complex.

12. The method of claim 8, further comprising determining if the network traffic comprises the attack traffic.

13. The method of claim 8, further comprising providing the alert to the route controller if greater than a predetermined amount of the network traffic comprises the attack traffic.

14. The method of claim 8, further comprising providing the alert to the route controller if the attack traffic is associated with a predetermined source.

15. The method of claim 8, further comprising receiving information from the scrubbing complex, wherein the information comprises information selected from the group consisting of an identity of sources of the attack traffic, a ranking of the sources of the attack traffic, and an identification of a type of the attack traffic.

16. A computer-readable device comprising instructions, which, when loaded and executed by a processor, cause the processor to perform operations comprising:
providing an alert to a route controller if greater than a configurable amount of network traffic comprises attack traffic, wherein the network traffic is addressed to a target;
redirecting, if greater than the configurable amount of the network traffic comprises the attack traffic, a portion of the attack traffic to a scrubbing complex;
transmitting a portion of non-attack traffic of the network traffic to the target without redirection to the scrubbing complex;
providing feedback to a route controller, wherein the portion of the attack traffic that is redirected to the scrubbing complex is adjusted by the route controller based on the feedback;
transmitting, to the target, scrubbed attack traffic from the scrubbing complex via a tunnel; and
ranking, by utilizing statistics determined by the scrubbing complex, a plurality of ingress points contributing to the attack traffic.

* * * * *